(12) United States Patent
Stanford et al.

(10) Patent No.: US 10,885,417 B1
(45) Date of Patent: Jan. 5, 2021

(54) IMPEDANCE-CHANGE MITIGATION IN RFID TAGS

(71) Applicant: Impinj, Inc., Seattle, WA (US)

(72) Inventors: Theron Stanford, Seattle, WA (US);
Charles J. T. Peach, Seattle, WA (US);
Jay A. Kuhn, Seattle, WA (US);
Harley K. Heinrich, Snohomish, WA (US); John D. Hyde, Corvallis, OR (US); Christopher J. Diorio, Shoreline, WA (US); Alberto Pesavento, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/797,801

(22) Filed: Feb. 21, 2020

Related U.S. Application Data

(63) Continuation of application No. 15/888,916, filed on Feb. 5, 2018, now Pat. No. 10,572,789, which is a continuation-in-part of application No. 15/191,540, filed on Jun. 24, 2016, now Pat. No. 9,886,658.

(60) Provisional application No. 62/194,739, filed on Jul. 20, 2015, provisional application No. 62/185,458, filed on Jun. 26, 2015.

(51) Int. Cl.
*G06K 19/07* (2006.01)

(52) U.S. Cl.
CPC ................ *G06K 19/0723* (2013.01)

(58) Field of Classification Search
CPC ............ G06K 19/0723; G06K 19/07749
USPC .......................... 235/487, 492, 494
See application file for complete search history.

(56) References Cited

U.S. PATENT DOCUMENTS

| | | | | |
|---|---|---|---|---|
| 2,715,209 | A * | 8/1955 | Williams, Jr. | H03F 3/40 324/99 R |
| 2004/0198271 | A1 * | 10/2004 | Kang | H03F 3/601 455/127.1 |
| 2007/0108297 | A1 * | 5/2007 | Bates | G06K 19/0707 235/492 |
| 2007/0171065 | A1 * | 7/2007 | Ku | H01L 27/0727 340/572.1 |
| 2008/0030336 | A1 * | 2/2008 | Endo | G06K 7/0008 340/572.1 |
| 2009/0140860 | A1 * | 6/2009 | Forster | G08B 13/2431 340/572.1 |
| 2012/0223590 | A1 * | 9/2012 | Low | H02J 50/80 307/104 |
| 2014/0232207 | A1 * | 8/2014 | Lee | H02J 50/80 307/151 |

* cited by examiner

*Primary Examiner* — Paultep Savusdiphol
(74) *Attorney, Agent, or Firm* — Hertzberg, Turk & Associates, LLC

(57) ABSTRACT

Embodiments are directed to mitigating power-based impedance changes in Radio Frequency Identification (RFID) tags. The intrinsic impedance of components in an RFID tag front-end may change as incident RF power on the tag changes, causing the input impedance of the front-end to change and altering the RF properties of the RFID tag. A number of approaches can be used to mitigate input impedance variations due to power variations. One approach involves adjusting the operating point of one or more components in the RFID tag front-end to change their intrinsic impedances so as to counteract or mitigate the RF-power-based input impedance variation.

20 Claims, 11 Drawing Sheets

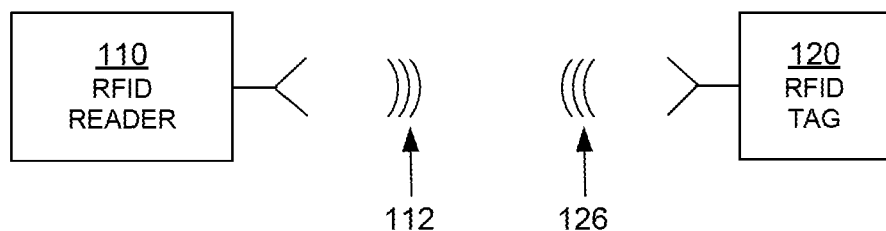
FIG. 1
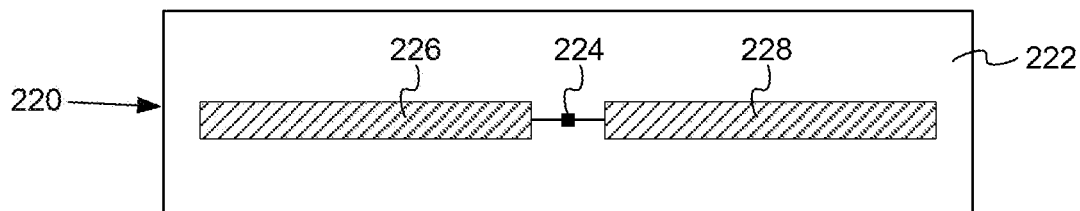
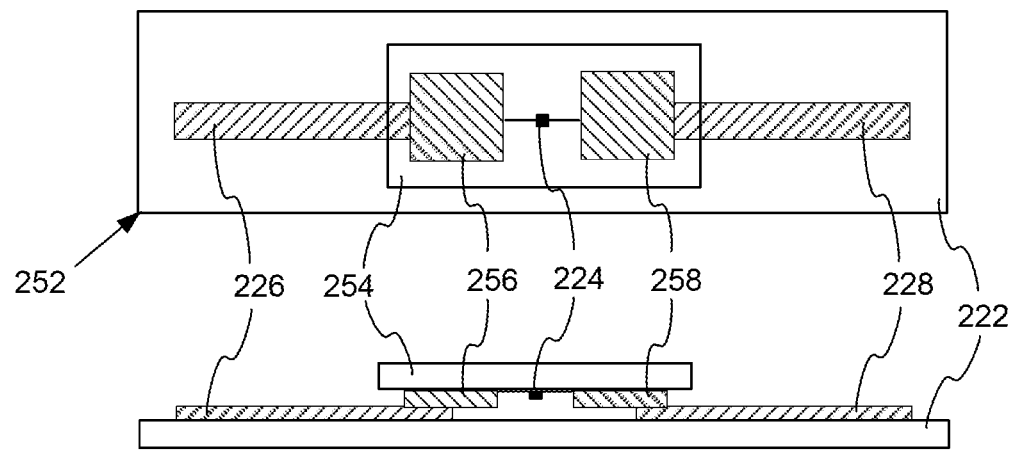
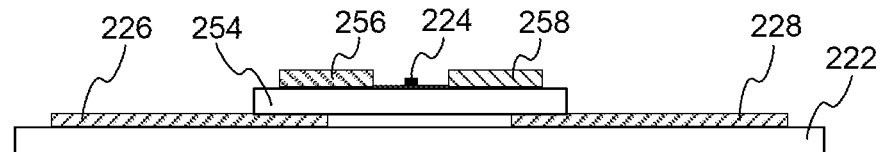
FIG. 2

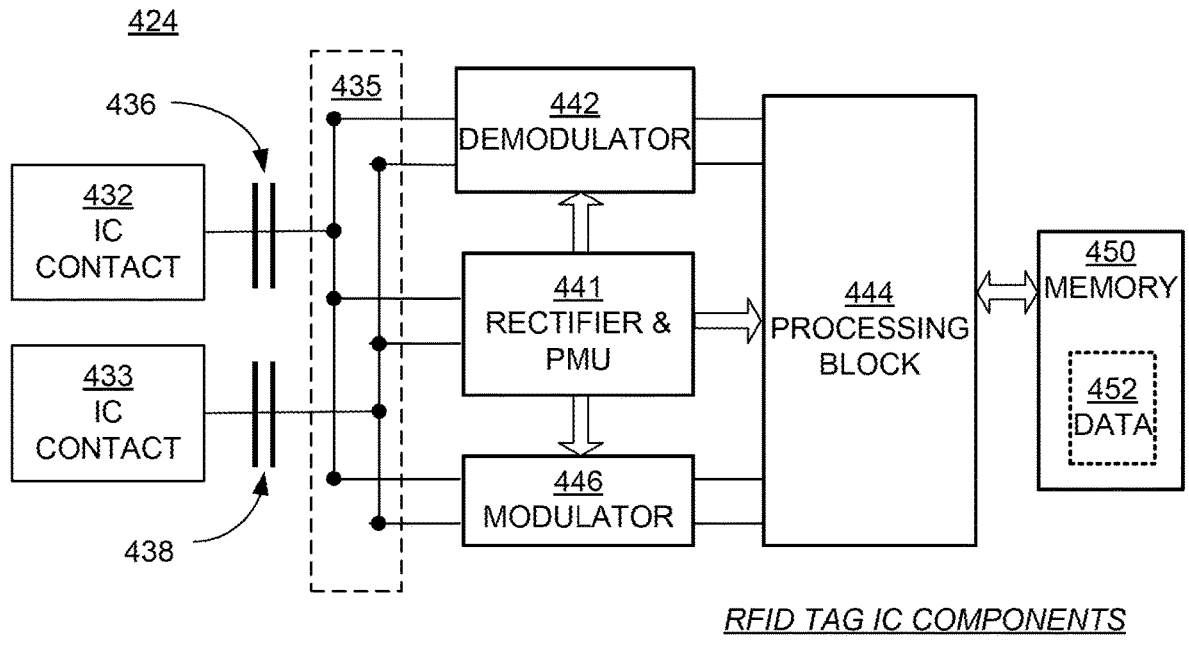
FIG. 4
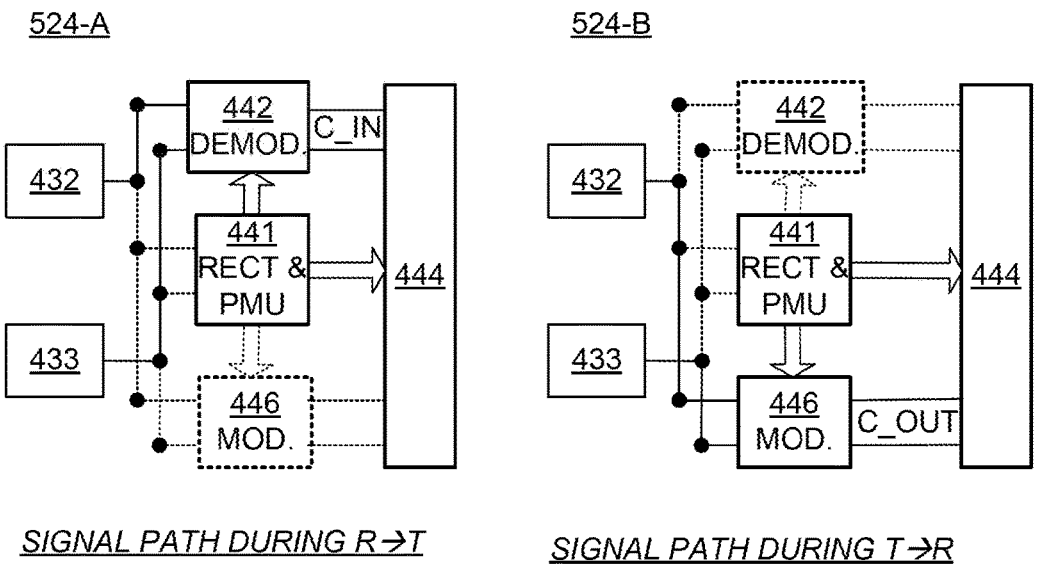
FIG. 5A  FIG. 5B

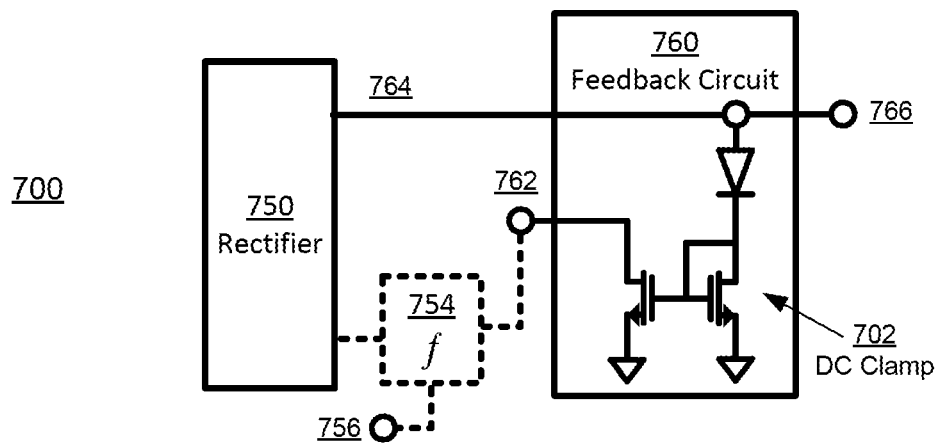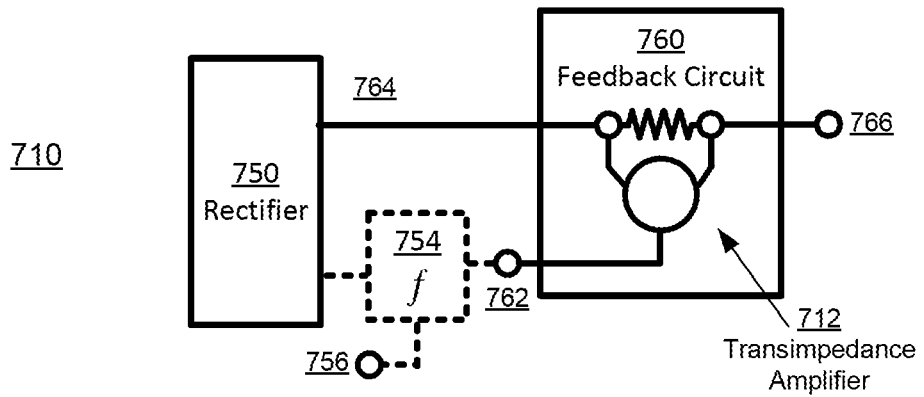
FIG. 7A

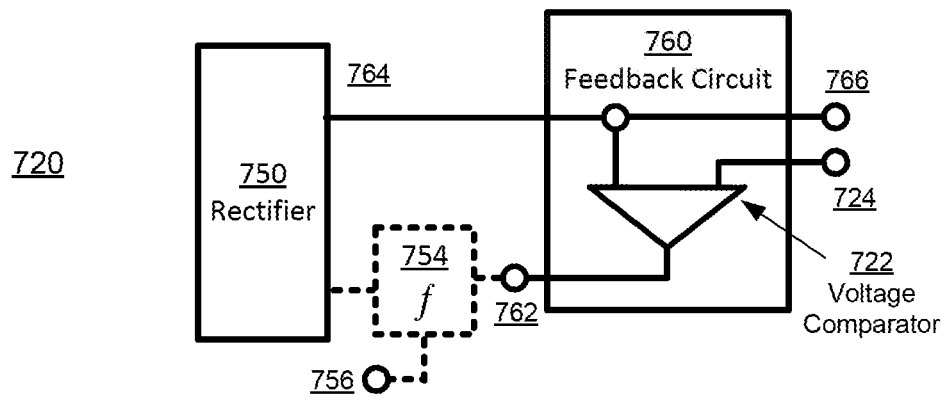
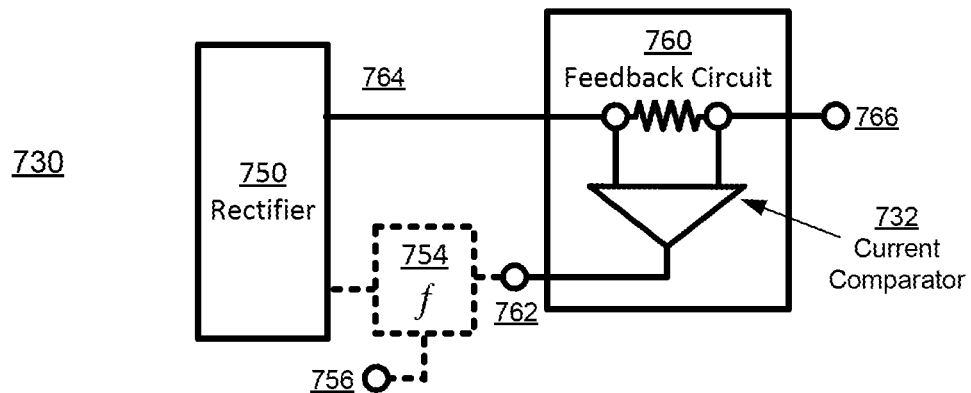
FIG. 7B

IMPEDANCE-CHANGE MITIGATION IN RFID TAGS

CROSS REFERENCE TO RELATED APPLICATIONS

This application is a continuation of U.S. application Ser. No. 15/888,916 filed on Feb. 5, 2018, which is a continuation-in-part application under 35 U.S.C. § 120 of U.S. patent application Ser. No. 15/191,540 filed on Jun. 24, 2016, now U.S. Pat. No. 9,886,658, which in turn claims the benefit of U.S. Provisional Patent Applications Serial Nos. 62/185,458, filed on Jun. 26, 2015 and 62/194,739, filed on Jul. 20, 2015. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader—tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either may itself generate and transmit the response RF wave, or may reflect back a portion of the interrogating RF wave in a process known as backscatter. Backscatter may take place in a number of ways.

The backscattered RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to mitigating power-based impedance changes in Radio Frequency Identification (RFID) tags. The intrinsic impedance of components in an RFID tag front-end may change as incident RF power on the tag changes, causing the input impedance of the front-end to change and altering the RF properties of the RFID tag. For example, a delta-gamma parameter associated with tag backscatter may be reduced. A number of approaches can be used to mitigate input impedance variations due to power variations. One approach involves adjusting the operating point of one or more components in the RFID tag front-end to change their intrinsic impedances so as to counteract or mitigate the RF-power-based input impedance variation. A second approach involves switching an RF clamp circuit out of the RFID tag front-end during backscatter to increase the front-end input impedance, thereby counteracting or mitigating RF-power-based input impedance variations. A third approach involves using different impedance configurations to modulate backscatter RF waves to counteract or mitigate RF-power-based input impedance variations.

In some examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to develop a parameter from an RF input voltage present at the IC input; detect a change in the parameter corresponding to a change in the RF input voltage, wherein the change in the RF input voltage may also reduce the intrinsic impedance; and increase the intrinsic impedance by adjusting an operating point of the rectifier based on the detected parameter change, to at least partially compensate for the reduction.

According to other examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to develop a parameter from an RF input voltage present at the IC input; determine a first value from the parameter at a first time; set an operating point of the rectifier based on the first value; determine a second value from the parameter at a second time after the first time; detect, based on the first and second values, a change in the parameter corresponding to a change in the RF input voltage, wherein the change in the RF input voltage may also reduce the intrinsic impedance; and increase the intrinsic impedance by adjusting the operating point of the rectifier based on at least the second value, to at least partially compensate for the reduction.

According to further examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to determine whether the intrinsic impedance has been reduced due to a change in an RF input voltage present at the IC input; determine whether the IC is about to enter a backscatter interval; and if the intrinsic impedance has been reduced and the IC is about to enter a backscatter interval, then increase the intrinsic impedance during the backscatter interval by adjusting an operating point of the rectifier, to at least partially compensate for the reduction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIGS. 7A and 7B depict example feedback circuits for detecting delivered voltage, current, and/or power, according to embodiments.

DETAILED DESCRIPTION

Figure 3:
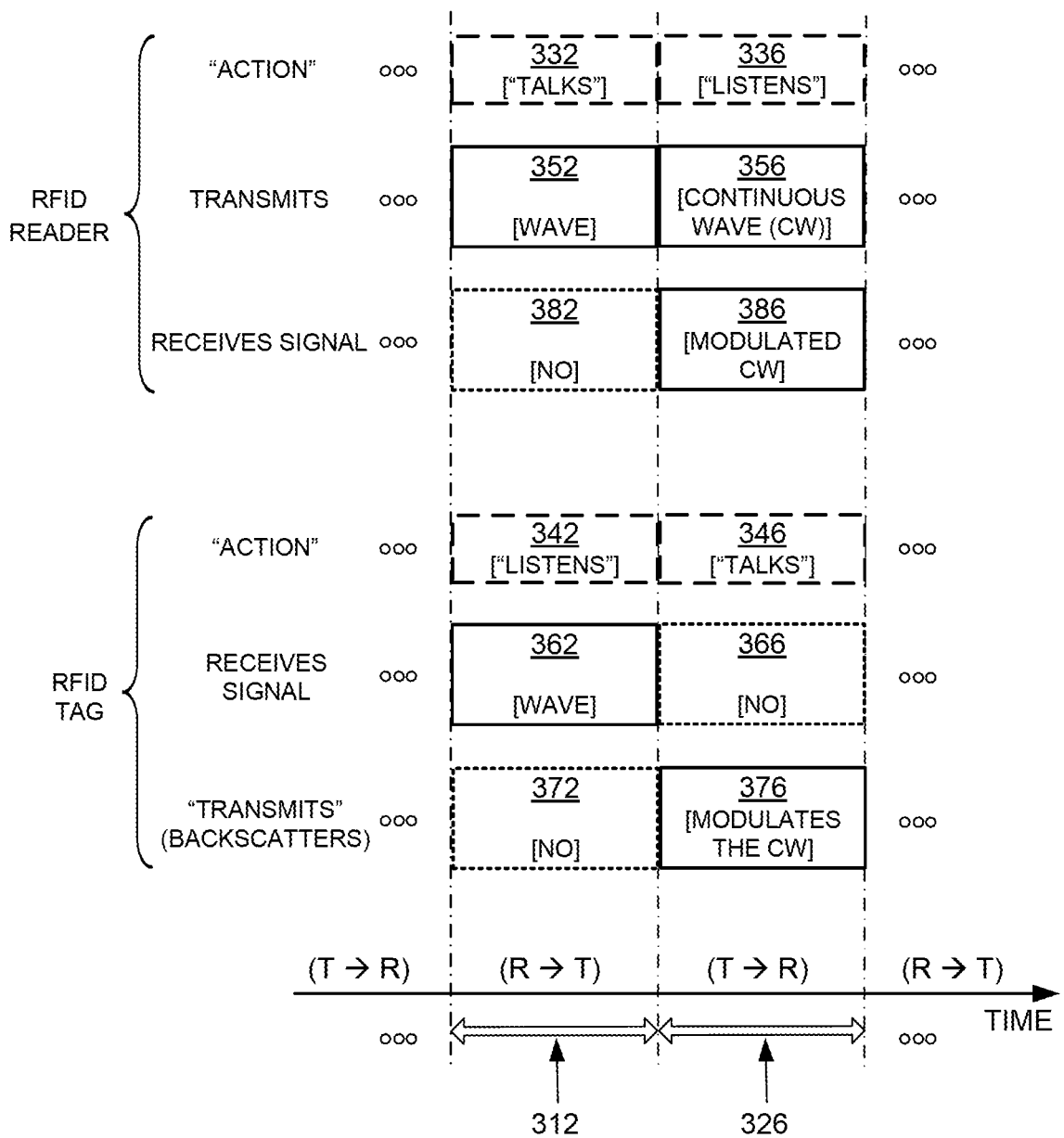
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration-specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

In some embodiments, an RFID tag responds to an interrogating RFID reader in a backscatter time interval, by modulating symbols representing data values onto backscattered or reflected portions of a reader-transmitted RF wave during the backscatter time interval. The way in which the RFID tag modulates data symbols onto the backscattered RF wave portions may be defined by one or more protocols. For example, the RFID tag may modulate data symbols onto backscattered RF waves using amplitude-shift keying (ASK) or phase-shift keying (PSK), as described in the Gen2 Specification. In other embodiments, any other suitable modulation scheme may be used as will be known to one of ordinary skill in the art.

During the backscatter time interval, the RFID tag may modulate data symbols onto a backscattered RF wave by switching an associated impedance between two or more different values in patterns corresponding to the data symbols. For example, the RFID tag may switch an impedance presented to an antenna of the RFID tag between a first impedance value and a second impedance value, thereby switching the reflectance of the antenna, to modulate data symbols onto a backscattered RF wave.

Data symbols may be modulated onto a backscattered RF wave as patterns of impedance values and/or transitions between impedance values. For example, a data symbol that corresponds to a binary data value of "0" may be represented by a first series of impedance values and/or impedance value transitions, and a data symbol that corresponds to a binary data value of "1" may be represented by a second series of impedance values and/or impedance value transitions.

The difference or separation between the first impedance value and the second value may be represented by a "delta-gamma" parameter, which may be a ratio of the first impedance value to the second impedance value (or vice-versa). Because the difference between the first impedance value and the second impedance value may be used to represent data values, the magnitude of the difference (or delta-gamma parameter) may affect the demodulation of the backscattered RF wave. For example, a relatively large delta-gamma parameter, corresponding to a relatively large-magnitude difference between the first impedance value and the second impedance value, may result in a backscattered RF wave that is relatively easy to demodulate. On the other hand, a relatively small delta-gamma parameter, corresponding to a relatively small-magnitude difference between the first impedance value and the second impedance value, may result in a backscattered RF wave that is more difficult to demodulate. A relatively small delta-gamma parameter may increase the demodulation difficulty of a resultant backscattered RF wave because an RFID reader receiving the backscattered RF wave may be unable to distinguish between the different impedance values or transitions used to represent different data values, for example due to environmental noise or signal degradation. Accordingly, in situations where impedance values used to modulate data onto a backscattered RF wave are relatively similar, increasing the delta-gamma parameter may improve the ability of an RFID reader to recover data from a backscattered RF wave.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals). Tag 120 can be a passive tag, or an active or battery-assisted tag (i.e., a tag having its own power source). When tag 120 is a passive tag, it is powered from signal 112.

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by generating and transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance as described above. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art, and may include one or more components configured to convert an alternating-current (AC) or time-varying signal into a direct-current (DC) or substantially time-invariant signal.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

As mentioned previously, embodiments are directed to mitigating power-based impedance changes in RFID tags. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or may be thought of in terms of various interconnected distinct software modules.

Figure 6:
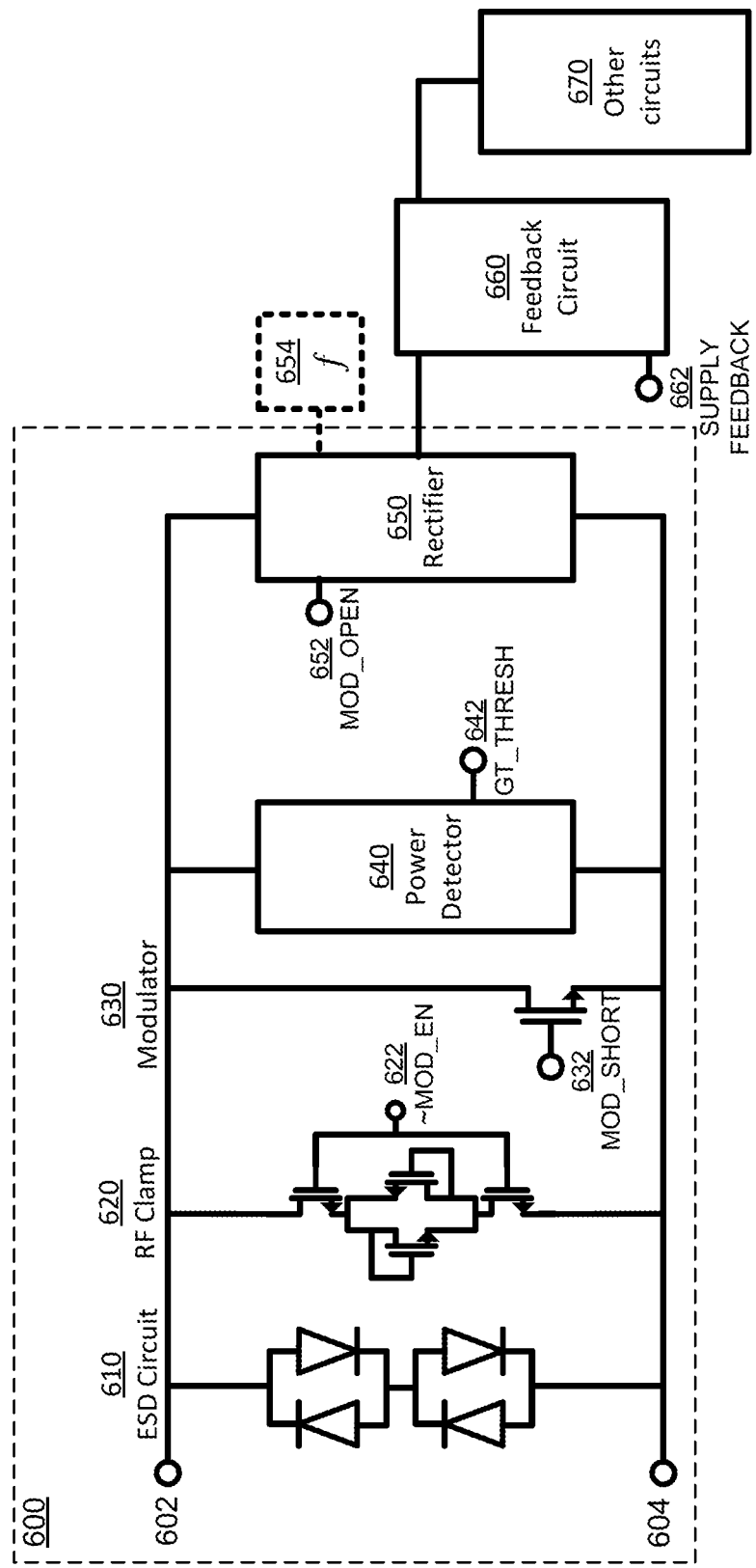
FIG. 6 depicts a simplified example diagram of an RFID integrated circuit front-end configured to mitigate power-based impedance changes, according to embodiments.

FIG. 6 depicts a simplified example diagram of an RFID integrated circuit front-end 600 configured to mitigate power-based impedance changes, according to embodiments. The front-end 600 is similar to portions of the circuit 424 in FIG. 4. For example, the front-end 600 includes a first terminal 602 and a second terminal 604, which may correspond to the IC contacts 432 and 433, respectively, of the circuit 424, and may be coupled to an antenna. The front-end 600 further includes an electrostatic discharge (ESD) circuit 610, an RF clamp 620, a modulator 630 (depicted in a simplified manner) similar to the modulator 446, a power detector 640 that may be part of the rectifier and PMU 441 and/or the demodulator 442, and a rectifier 650 similar to the rectifier and PMU 441. The rectifier 650 may additionally be coupled to an optional operating-point adjustment circuit 654, a feedback circuit 660, and other circuits 670.

The ESD circuit 610 may be configured to provide protection against high voltages across the terminals 602 and 604 that could potentially damage other components of the RFID IC. In some embodiments, the ESD circuit 610 may include diodes (as depicted) or diode-connected transistors, while in other embodiments any arrangement of elements configured to provide protection against high voltages may be used.

The RF clamp 620 may be configured to adjust the voltages associated with an incident RF wave to facilitate demodulation of the incident RF wave in response to an input ~MOD_EN 622. For example, if a voltage between the first and second terminals 602 and 604 induced by an incident RF wave is too high, the input 622 may be actuated via an input signal to couple the RF clamp 620 to the terminals 602 and 604, which may then limit the magnitude of the induced voltage between the terminals 602 and 604. Similarly, the input 622 can also be actuated via an input signal to decouple the RF clamp 620 from the terminals 602 and 604. In some embodiments, the RF clamp 620 may include diode-connected transistors coupled to the first and second terminals 602 and 604 by one or more transistor switches, which in turn are coupled to the input 622, as depicted. In other embodiments, the RF clamp 620 may include any other arrangement of elements configured to adjust the voltage between the terminals 602 and 604. In some embodiments, RF clamp 620 may be configured to vary the electrical resistance between the terminals 602 and 604 in a continuous manner, or in three or more discrete steps (in other words, not just "coupled" or "decoupled" as described above). The electrical resistance variation may be based on signals received from an input, such as the input 622 or another suitably-configured input.

The modulator 630 may be configured to modulate an impedance across the terminals 602 and 604 based on signals from an input MOD_SHORT 632. For example, other circuits in the RFID IC (for example, the other circuits 670) may provide signals to input MOD_SHORT 632 to modulate the input impedance of the front-end 600 (that is, the impedance of front-end 600 viewed from the terminals 602 and 604) and the reflectance of an antenna coupled to the terminals 602 and 604. Modulator 630 may be implemented using a single transistor switch, as depicted in FIG. 6, or may include other circuitry that contribute to and/or allow adjustment of the input impedance of the front-end 600.

The power detector 640, which may be part of another IC component (such as the rectifier and PMU 441 and/or the demodulator 442), may be configured to detect a power associated with an RF wave incident on a coupled antenna for power harvesting and/or demodulation, and, in some embodiments, may implement a peak detector (for example, a detector configured to determine the maximum or minimum value of an oscillating signal) and/or an envelope detector (for example, a detector configured to determine the envelope or extremes of an oscillating signal).

The rectifier 650, which may be similar to or implemented within rectifier and PMU 441, is configured to harvest energy from an RF wave incident on a coupled antenna to power components of the RFID IC. The rectifier 650 may be coupled to the optional operating-point adjustment circuit 654, described in more detail below. The output of rectifier 650 may be coupled to the feedback circuit 660 and the other circuits 670. For example, the rectifier 650 may deliver voltage and current rectified from incident RF signals to the feedback circuit 660 and the other circuits 670, for power, sensing, and/or any other suitable purpose. In some embodiments, the feedback circuit 660 may output a supply feedback signal 662 based on the voltage, current, and/or power delivered by the rectifier 650.

As depicted in FIG. 6, the ESD circuit 610, the RF clamp 620, the modulator 630, the power detector 640, and the rectifier 650 may all bridge the first and second terminals 602/604 and may therefore affect the input impedance of the front-end 600. In fact, the RFID IC may modulate a backscattered RF wave by adjusting the input impedance of the front-end 600. For example, the RFID IC may use the front-end 600 to modulate an incident RF wave to form a backscattered RF wave encoding data values by having the modulator 630 switch between an electrical short-circuit state and an electrical open-circuit state according to a pattern associated with the data values to be encoded, via the action of the input MOD_SHORT 632. As defined in this description the electrical short-circuit and open-circuit states are not ideal short and open circuits. When the modulator 630 is in the electrical short-circuit state, the input impedance of the front-end 600 may have low electrical resistance, similar to an electrical short-circuit and corresponding to the first impedance value (or the second impedance value) as described above. On the other hand, when the modulator 630 is in the electrical open-circuit state and therefore has a very high resistance, the input impedance of the front-end 600 may be based on the combined impedances of the other elements in the front-end 600, corresponding to the second impedance value (or the first impedance value if the low electrical impedance corresponds to the second impedance value).

Because the components in the front-end 600 contribute to the input impedance of the front-end 600 during backscatter, changes in the intrinsic impedances of those components may affect the delta-gamma parameter of the front-end 600. A component's intrinsic impedance refers to the natural impedance of the component resulting from the electronic characteristics of the component and/or elements that form the component. The intrinsic impedance of some components may vary as the voltage, current, and/or power associated with those components vary. These variations may be linear (i.e., directly proportional) or nonlinear (i.e., not directly proportional) with respect to the associated voltage, current, or power change, and may be a consequence of changes in component operating points due to the associated voltage, current, or power change. The operating point of an electronic circuit, device, or component, also known as its bias point, quiescent point, or Q-point, refers to the operating condition of the component once certain voltages and/or currents have been established within the component. In some embodiments, the operating point of a component may specifically refer to or be defined by one or more direct-current (DC) or steady-state voltage and/or current values at one or more locations within and/or terminals of the component, in the absence of an alternating-current (AC) signal. The DC voltage and/or current values associated with a component's operating point may be referred to as the bias or biasing of the component.

Accordingly, as the voltages, currents, and power associated with the front-end 600 change due to variations in the incident RF wave over time, the operating points of the components within or coupled to the front-end 600, such as the ESD circuit 610, the RF clamp 620, the modulator 630, the power detector 640, and/or the rectifier 650 may also change, causing the intrinsic impedances of the components and potentially the input impedance of the front-end 600 to vary over time. For example, the rectifier 650 may have nonlinear behavior (i.e., lack a linear or directly proportional relationship between current and voltage), for example due to the inclusion of one or more nonlinear elements. Accordingly, as the power input into the rectifier 650 changes, its operating point changes nonlinearly with respect to the changes in the power input, causing its intrinsic impedance to change. In some situations, the rectifier 650 may sink more current (in other words, pass more current to ground) as input power increases. The increased current in turn changes the operating point of the rectifier 650 and causes its intrinsic impedance to decrease. As the intrinsic impedance of the rectifier 650 decreases, the input impedance of the front-end 600 also decreases. If the different impedance values used for backscatter modulation includes both an electrical short-circuit state (from the modulator 630) and the reduced input impedance of the front-end 600 due to the reduced intrinsic impedance of the rectifier 650, then the delta-gamma parameter associated with the front-end 600, which is based on the separation or ratio between the different impedance values used for backscatter, may be correspondingly reduced, which may adversely affect data recovery from the backscattered RF wave.

Several approaches may be used to mitigate reduction of the input impedance of the front-end 600 due to power-based impedance changes. In this disclosure, "mitigation" of a particular change, such as an impedance change, refers to actions taken to counteract, reverse, and/or compensate, at least partially, for the particular change. For example, an impedance reduction may be mitigated by increasing an associated impedance, and an impedance increase may be mitigated by decreasing an associated impedance. In some embodiments, mitigation may address the results of a particular change. For example, an impedance reduction that results in a decreased delta-gamma parameter may be mitigated by increasing the delta-gamma parameter in some way that does not involve increasing an impedance.

A first approach to mitigate reduction of the input impedance of the front-end 600 due to power-based impedance changes involves switching the RF clamp 620 out of the front-end 600 prior to a backscatter interval via input ~MOD_EN 622. The input 622 may be connected to the modulator 630 or another control circuit, and may be configured to decouple or disconnect the RF clamp 620 from the front-end 600 via one or more switches when the modulator 630 is operational (in other words, when MOD_EN="1" and therefore ~MOD_EN="0") prior to a backscatter interval. As the RF clamp 620 reduces the input impedance of the front-end 600 when connected, disconnecting the RF clamp 620 increases the input impedance of the front-end 600. The increase in input impedance of the front-end 600 acts to at least partially compensate for or mitigate a reduction of the input impedance of the front-end 600 due to power-based intrinsic impedance changes.

The RF clamp 620 may be switched out of the front-end 600 prior to a backscatter interval because the act of switching the RF clamp 620 out may result in unintentional changes to a backscattered RF wave that a listening reader could interpret as a data symbol. Accordingly, the modulator 630 or another control circuit may be configured to switch the RF clamp 620 out of the front-end 600 before backscattering, when an external reader is not listening for symbols. As a result, any changes in the backscattered RF wave caused by disconnection of the RF clamp 620 may be ignored by the external reader. Similarly, the RF clamp 620 may be reconnected after backscattering, when an external reader is not listening for symbols, in order to prevent an unintentional symbol from being sent to the external reader. Otherwise, when not within a backscatter interval or preparing for backscattering, the RF clamp 620 may remain connected to the front-end 600, especially when receiving symbols from an external reader.

Similar techniques can be used in embodiments where the RF clamp 620 is configured to vary the electrical resistance between terminals 602 and 604 continuously or in three or more discrete steps. For example, a control circuit may be configured to increase the impedance or resistance of RF clamp 620 prior to a backscatter interval and decrease the impedance of resistance of RF clamp 620 after the backscatter interval.

A second approach to mitigate reduction of the input impedance of the front-end 600 due to power-based intrinsic impedance changes involves adjusting the operating point of one or more components within or coupled to the front-end 600. For example, the operating point of the rectifier 650 may be adjusted to mitigate an intrinsic impedance change associated with the rectifier 650 or another component associated with the front-end 600. As mentioned above, increased power extraction may cause the operating point of the rectifier 650 or other components to change, reducing the intrinsic impedances of the rectifier 650 or other components and reducing the input impedance of the front-end 600. Adjusting the operating point of the rectifier 650 so as to reduce its power extraction efficiency results in reduction of extracted power, but may increase the intrinsic impedance of the rectifier 650. The increase in intrinsic impedance of the rectifier 650 may mitigate either a reduction in intrinsic impedance of the rectifier 650 or a reduction in intrinsic impedances of the other components, and therefore mitigate input impedance reduction of the front-end 600 due to intrinsic impedance reductions associated with coupled components. In other embodiments, the operating points of other components associated with the front-end 600 may also be adjusted, in addition to or instead of the operating point of the rectifier 650, in order to mitigate intrinsic impedance changes associated with changes in the input RF voltage across the front-end 600. For example, the operating points of ESD circuit 610, the RF clamp 620, the modulator 630, the power detector 640, and/or a demodulator coupled to the front-end 600 may be adjusted to mitigate intrinsic impedance changes.

Operating point adjustment may be accomplished by adjusting some parameter associated with a component. For example, the operating point of a component having a variable resistance or impedance may be adjusted by adjusting a value of the variable resistance or impedance. If a component is biased, then the component's biasing can be adjusted to adjust the component's operating point. For example, reducing the biasing of the rectifier 650 may adjust its operating point, thereby reducing its power extraction efficiency and increasing its intrinsic impedance. Several techniques for reducing the biasing of a rectifier such as the rectifier 650 are described below, although in other embodiments, any other techniques may be used to reduce the efficiency of the rectifier 650, as will be known to those of ordinary skill in the art. In some embodiments, adjustment of the efficiency of the rectifier 650 may be performed by switching one or more stages of the rectifier 650 in or out, adjusting the threshold voltages of one or more devices of the rectifier 650 (e.g., one or more floating gate devices of the rectifier 650), and/or switching between two or more rectifiers, each with different thresholds.

Reduction of the biasing of the rectifier 650 may be accomplished via a dual-operating-point mode or a multi-operating-point mode. When operating in the dual-operating-point mode, the rectifier 650 may either be set at a first operating point where it is normally biased (i.e., with no bias reduction due to intrinsic impedance change mitigation) or at a second operating point where it is significantly de-biased (i.e., with significant bias reduction due to intrinsic impedance change mitigation). When operating in the multi-operating-point mode, the rectifier 650 may be set at one of three or more different operating points, where each operating point is associated with the application of a different bias to the rectifier 650. For example, the rectifier 650 may be normally biased at a first operating point, may be partially de-biased at a second operating point, and may be entirely de-biased at a third operating point. In some embodiments, the biasing of the rectifier 650 may be continuous, allowing a continuous range of operating points instead of discrete operating points.

Because intrinsic impedance reduction may vary with incident power, the determination of the operating point for a component such as the rectifier 650 may be based on one or more measurements of the incident RF power or a parameter correlating to and developed from (for example, derived from) the incident power. In some embodiments, the developed parameter is associated with power delivered to (e.g., as input) or delivered from (e.g., as output) a particular component associated with the front-end 600. For example, parameters developed by the rectifier 650 as a result of the incident RF power or voltage and consequently measured may include a delivered rectifier voltage, a delivered rectifier current, and/or a delivered rectifier power. The delivered rectifier voltage, rectifier current, and/or rectifier power may be developed and/or measured at the output of the rectifier 650. For example, the feedback circuit 660 coupled to the output of the rectifier 650 may be configured to measure a voltage, current, and/or power delivered from the rectifier. In some embodiments, the delivered rectifier voltage, current, and/or power may be developed and/or measured within the rectifier 650, for example at the input or output of a rectifier stage within the rectifier 650 or at a node within a rectifier stage within the rectifier 650. The parameter to be measured may be developed from other components associated with the front-end 600, such as the ESD circuit 610, the RF clamp 620, the modulator 630, the power detector 640, an envelope detector associated with the front-end 600, and/or any other component associated with or coupled to the front-end 600. The developed parameter may be correlated to the incident RF power, and may also be correlated to the input impedances of a particular component and/or the front-end 600.

Measurements of the developed parameter may then be used to determine an operating point for the rectifier 650 appropriate for mitigating intrinsic impedance changes. In some embodiments, an appropriate operating point may be determined in terms of settings for the rectifier 650 or other component, such as bias current settings, biasing potential settings, and the like. The rectifier 650, the other component, and/or a controller may then use the determined settings to set the operating point of the rectifier 650 or other component accordingly. The operating point determination may be based on individual measurements of the developed parameter and/or on differences between two or more measurements of the developed parameter. The measurements or differences may be provided directly to the rectifier 650, which may then determine and set itself at an appropriate operating point. The measurements or differences may also (or instead) be provided to a control circuit, which may then determine and set an appropriate operating point for the rectifier 650. For example, the measurements or differences may be taken by the feedback circuit 660 and provided (e.g., via an output SUPPLY FEEDBACK 662) to the operating-point adjustment circuit 654, which may be configured to generate and provide an appropriate operating point to the rectifier 650 and/or other components associated with the front-end 600. In some embodiments, the measurements or differences may be provided to another controller on the tag IC, which then generates and provides an appropriate operating point. In other embodiments, the measurements or differences may be provided to another entity, such as an RFID reader. The RFID reader may then determine an appropriate operating point and instruct the rectifier 650 or component associated with the front-end 600 (e.g., via a command sent to the IC and indicating the appropriate operating point or a location in IC memory storing the appropriate operating point) to set itself accordingly. In yet other embodiments, a feedback circuit such as the feedback circuit 660 may be configured to itself generate and provide an appropriate operating point to a rectifier and/or other components associated with the IC front-end.

Operating points appropriate for mitigating intrinsic impedance changes may be determined in a number of ways. For example, appropriate operating points may be determined based on stored data, such as a lookup table relating developed parameter values or differences in developed parameter values to operating point settings (e.g., biasing values). Appropriate operating points may also be determined based on one or more algorithms or transfer functions (e.g., mathematical functions that relate the output of a system to the input), implemented as instructions for a controller or processor block, a particular configuration of a reconfigurable controller or circuit block, and/or as a hard-wired or otherwise unchangeable circuit block or feedback circuit, such as circuit 654, that output operating point settings or biasing values in response to inputs correlated to power or parameters developed based on power. As another example, a measured value of a developed parameter (described above) or a difference between two measurements of the developed parameter may be compared to one or more thresholds, and appropriate operating points may be determined based on whether the one or more thresholds are satisfied (for example, whether the measured value or difference is greater than, less than, and/or equal to the one or more thresholds).

In some embodiments, appropriate operating points may be determined based on one or more stability criterion. As described above, the intrinsic impedance of certain electronic components may decrease with increasing power. Adjusting the intrinsic impedance to mitigate the intrinsic impedance decrease may in some situations lead to instability, for example due to positive feedback. Accordingly, determination of an appropriate operating point for a component may involve ensuring that the operating point does not place the component and/or the front-end 600 into an unstable state by determining whether the operating point satisfies one or more stability criteria (that is, indicators of whether a particular system is stable). One example stability criterion may be that when the operating point adjustment of the component is modeled as a forward feedback loop, appropriate operating points cause the feedback loop to have a gain less than unity. Other stability criteria may also be used, such as other stability criteria for forward feedback loops, stability criteria for negative feedback loops, or stability criteria for other potentially unstable systems, as known to those of ordinary skill in the art.

Operating point adjustment may also be used to enhance backscatter modulation, instead of or in addition to the other techniques described herein. As described above, an RFID IC may use the front-end 600 to modulate an incident RF wave by having the modulator 630 switch between an electrical short-circuit state and an electrical open-circuit state. In one embodiment, when the modulator 630 is in the electrical short-circuit state during a portion of a backscatter interval, the rectifier 650 may be set to an operating point that reduces the intrinsic impedance of the rectifier 650, thus further reducing the input impedance of the front-end 600. For example, the intrinsic impedance of the rectifier 650 may be significantly reduced by significantly increasing the biasing of the rectifier 650. The reduction in input impedance of the front-end 600 when the modulator 630 is in the electrical short-circuit state during the backscatter interval portion may increase the impedance separation between the two input impedance values used by the front-end 600 for modulation during the backscatter interval.

In another embodiment, when the modulator 630 is in the electrical open-circuit state during a portion of a backscatter interval, one or more unused circuits or components in the RFID IC (for example, those relating to functions or operations not associated with backscatter) may be turned off (e.g., deprived of power or instructed to switch off) during that backscatter interval portion to reduce the IC power consumption. The reduced IC power consumption may enable the biasing of the rectifier 650 to be further reduced, because the rectifier 650 no longer has to supply sufficient power for the unused circuits to operate. This further increases the intrinsic impedance of the rectifier 650, and accordingly increases the input impedance of the front-end 600 when the modulator 630 is in the electrical open-circuit state, further increasing the impedance separation between the two input impedance values used by the front-end 600 for modulation during the backscatter interval.

In some embodiments, biasing the rectifier 650 to different operating points may be accomplished in a substantially continuous or analog manner instead of in discrete steps or states. For example, the biasing of the rectifier 650 may vary continuously, either linearly or nonlinearly, based on the value of a developed parameter, and may be determined based on an algorithm or transfer function relating the developed parameter to biasing values of the rectifier 650. In one embodiment, an analog circuit block or feedback circuit such as the circuit 654 may be implemented to directly transform an input based on a developed parameter to an operating point setting or biasing value for the rectifier 650 based on the algorithm or transfer function.

Switching the rectifier 650 between different operating points (for example, a normally-biased, undiminished-efficiency state and one or more reduced-bias, reduced-efficiency states) may be accomplished via input MOD_OPEN 652. A signal of a first value applied to input 652 may set the rectifier 650 at a first operating point (for example, the undiminished-efficiency state), whereas a signal of a second value applied to input 652 may set the rectifier 650 at a second operating point (for example, one of the reduced-efficiency states).

In some embodiments, the rectifier 650 (or other components associated with the front-end 600) may be set to an operating point determined to mitigate intrinsic impedance reduction due to increased power whenever the RFID IC is backscattering, and may be normally-biased otherwise. In other embodiments, the rectifier 650 may only be set to an operating point determined to mitigate impedance reduction during backscatter if the extracted or incident power is above a particular threshold. For example, the power detector 640 may implement output GT_THRESH 642 whose value is used to determine whether the operating point of the rectifier 650 should be adjusted during backscatter. If the power detected by the power detector 640 is at or above a particular threshold, output 642 may have a first value that, when used as an input to an intermediate controller circuit or directly to the rectifier 650 (for example, via input MOD_OPEN 652), causes the rectifier 650 to be set at an operating point determined to mitigate intrinsic impedance reduction. If the power detected by the power detector 640 is below the particular threshold, output 642 may have a second value that does not cause the operating point of the rectifier 650 to be changed, at least for impedance-reduction-mitigation purposes.

The approaches described above attempt to mitigate or compensate for power-based reduction of the input impedance of the front-end 600 by increasing the front-end input impedance, for example by switching out the RF clamp 620 to increase the front-end input impedance, adjusting the operating point of the rectifier 650 to increase the intrinsic impedance of the rectifier 650, and/or adjusting the operating point of one or more other components coupled to the front-end 600, thereby also increasing the front-end input impedance.

A third approach to address power-based reduction of the input impedance of the front-end 600 involves using different impedance configurations to modulate backscattered RF waves. An RFID IC may modulate a backscattered RF wave with data symbols by switching the front-end 600 between a first impedance value and a second impedance value based on a pattern associated with the data symbols. In a first impedance configuration, the first impedance value may be the input impedance of the front-end 600 with the modulator 630 in an electrical short-circuit state (e.g., with the switch MOD_SHORT 632 on) and the second impedance value may be the input impedance of the front-end 600 with the modulator 630 in an electrical open-circuit state (e.g., with the switch MOD_SHORT 632 off). In a second impedance configuration, for example when power-based reduction of the input impedance of the front-end 600 is significant, the two impedance values may selected such that they do not correspond to different states of the modulator 630 but instead correspond to different operating points of the rectifier 650. For example, in the second impedance configuration the first impedance value may be the input impedance of the front-end 600 when the rectifier 650 is set at a first, normally-biased operating point, and the second impedance value may be the input impedance of the front-end 600 when the rectifier 650 is set at a second, low-bias operating point. In this example, if incident/extracted RF power is relatively high, the first impedance value may be relatively low due to power-based intrinsic impedance reduction, whereas the second impedance value may be relatively high due to the low-bias operating point of the rectifier 650. In some embodiments, the first impedance value of the second impedance configuration may be the input impedance value of the front-end 600 when the rectifier 650 is set at a third, high-bias operating point.

The front-end 600 may be configured to switch from the first impedance configuration to the second impedance configuration whenever the RFID IC is backscattering. In other embodiments, the front-end 600 may be configured to switch between the first impedance configuration and the second impedance configuration based on whether the extracted or incident power is above a particular threshold, as described above with respect to output GT_THRESH 642. For example, the front-end 600 may be switched to the second impedance configuration if output GT_THRESH 642 has the first value, corresponding to detected power at or above the particular threshold, and may be switched to the first impedance configuration if output GT_THRESH 642 has the second value, corresponding to detected power below the particular threshold. In some embodiments, the front-end 600 may be configured to switch back to the first impedance configuration upon completion of backscatter, when instructed by a reader, or when some other criterion is met.

As described above, a feedback circuit such as the feedback circuit 660 may be configured to measure a voltage, current, and/or power delivered from the rectifier, and may either provide the measurements to another entity or circuit for operating point adjustment or use the measurements itself to adjust operating points. FIGS. 7A and 7B depict example feedback circuits for detecting delivered voltage, current, and/or power, according to embodiments.

FIGS. 7A and 7B depict, in diagrams 700, 710, 0720, and 730, example implementations of a feedback circuit 760, which may be similar to the feedback circuit 660 in FIG. 6. In each of the diagrams, feedback circuit 760 is coupled to (and further passes on as output 766) an output 764 of rectifier 750, which may be similar to rectifier 650. Feedback circuit 760 also provides an output signal via feedback output 762 to rectifier 750 or another component (e.g., via another output 756) directly or through optional operating-point adjustment circuit 754, which may be similar to operating-point adjustment circuit 654.

In diagram 700 in FIG. 7A, feedback circuit 760 includes a DC clamp circuit 702 coupled to rectifier output 764 and feedback output 762. As described above, when incident RF power increases, the power extracted by rectifier 750 also increases, which may cause rectifier operating point changes, reduction in rectifier intrinsic impedance, and reduction of overall front-end impedance. In this situation, DC clamp circuit 702 may be configured to (a) divert current flowing from rectifier output 764 to output 766 when the voltage (i.e., the delivered voltage from rectifier 750) on rectifier output 764 exceeds a particular threshold, and (b) provide an output signal that varies continuously according to the current diverted through DC clamp circuit 702 from rectifier output 764. The threshold to which the voltage on rectifier output 764 is compared may be set by the feedback circuit 760 or another controller on the tag IC. The output signal, which varies continuously with respect to the diverted current and the power extraction of the rectifier 750, may then be used to adjust the operating point of rectifier 750, either directly or via operating-point adjustment circuit 754. For example the biasing of the rectifier 750 may be adjusted based on the output signal to reduce power extraction efficiency, thereby reducing power extraction and at least partly mitigating the intrinsic impedance reduction due to increased incident RF power. In some embodiments, the output signal may be used to adjust other components associated with the front-end, as described above.

In diagram 710 in FIG. 7A, feedback circuit 760 includes a transimpedance amplifier 712 coupled to rectifier output 764, output 766, and feedback output 762. Transimpedance amplifier 712 may be configured to sense the current flowing between rectifier output 764 and output 766 and output a signal that varies continuously based on the sensed current, somewhat similar to DC clamp circuit 702. The output signal may then be provided via feedback output 762 for adjustment of the operating point of rectifier 750 and/or other components, directly or via operating-point adjustment circuit 754. For example, if incident RF power increases, the power extracted by rectifier 750 and therefore the current flowing between rectifier output 764 and output 766 may increase. When transimpedance amplifier 712 senses the increased current, its output signal may also increase, and the output signal may then be used to adjust the operating point of the rectifier 750 to reduce its power extraction efficiency, thereby at least partly mitigating intrinsic impedance reduction due to increased incident RF power.

In diagram 720 in FIG. 7B, feedback circuit 760 includes a voltage comparator 722 coupled to rectifier output 764, output 766, and feedback output 762. Voltage comparator may be configured to compare the voltage on rectifier output 764 with a threshold received via comparator input 724 and output a value based on the comparison to feedback output 762. In contrast to the feedback circuit implementations in diagrams 700 and 710, the implementation in diagram 720 may not output a signal that varies continuously based on the output of rectifier 750, but instead may output a signal that varies in a discrete fashion. For example, as long as the voltage on rectifier output 764 has a smaller magnitude than the threshold received via comparator input 724, voltage comparator 722 may output a first value, regardless of how much smaller the voltage is with respect to the threshold. Similarly, if the voltage on rectifier output 764 has a larger magnitude than the threshold, voltage comparator 722 may output a second value, regardless of the difference between the voltage and the threshold.

In diagram 730 in FIG. 7B, feedback circuit 760 includes a current comparator 732 coupled to rectifier output 764, output 766, and feedback output 762. Current comparator 732 may be configured to compare the current flowing between rectifier output 764 and output 766 with a threshold and output a value based on the comparison to feedback output 762. Current comparator 732 may not output a signal that varies continuously based on the current flowing between rectifier output 764 and output 766, but instead may output a signal that varies in a discrete fashion. For example, as long as the current between outputs 764 and 766 has a smaller magnitude than the comparison threshold, current comparator 732 may output a first value, regardless of the difference between the current and the threshold. Similarly, as long as the current between outputs 764 and 766 has a larger magnitude than the comparison threshold, current comparator 732 may output a second value, regardless of the difference between the current and threshold.

While FIGS. 7A and 7B depict several example implementations for a feedback circuit, any suitable feedback circuit implementation that provides a continuously-varying or discretely-varying output based on a rectifier output may be used.

Figure 8:
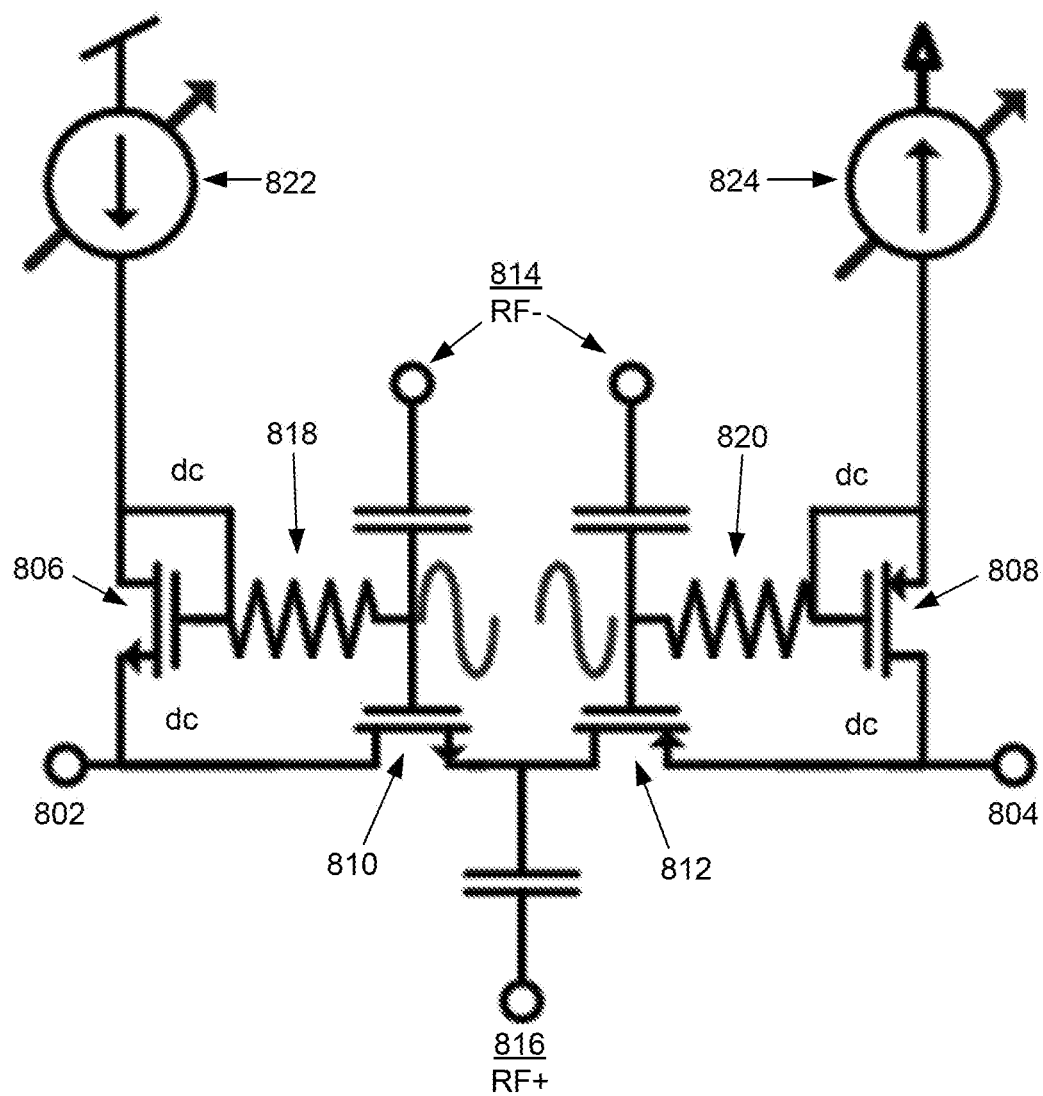
FIG. 8 depicts an example rectifier stage configured to mitigate power-based impedance changes according to embodiments.

FIG. 8 depicts an example rectifier stage 800 configured to mitigate power-based impedance changes according to embodiments. The rectifier stage 800 is implemented with n-channel metal-oxide semiconductor (NMOS) transistors and p-channel metal-oxide semiconductor (PMOS) transistors as rectifying and biasing elements. A main current path of the rectifier stage 800 extends from anode 802 to cathode 804, through a drain and source of a rectifying NMOS transistor 810 and a drain and source of a rectifying PMOS transistor 812. The source of the rectifying NMOS transistor 810 and the drain of the rectifying PMOS transistor 812 are coupled to an RF+ input 816, which in turn may receive an RF signal having a particular phase from an IC contact (e.g., one of the IC contacts 432/433) or terminal (e.g., one of the terminals 602/604). The gates of the rectifying NMOS transistor 810 and the rectifying PMOS transistor 812 are coupled to an RF− input 814, which may receive an RF signal of a different phase than RF+ input 816 from another IC contact or terminal.

The gates of the rectifying NMOS transistor 810 and the rectifying PMOS transistor 812 are also coupled to the gates of a corresponding bias transistor via respective high-resistance RF blocks. For example, the gate of the rectifying NMOS transistor 810 is coupled to the gate of a bias NMOS transistor 806 via an RF block 818, and the gate of the rectifying PMOS transistor 812 is coupled to the gate of a bias PMOS transistor 808 via an RF block 820. The gate and drain of the bias NMOS transistor 806 are coupled together and to a variable current source 822, and the gate and source of the bias PMOS transistor 808 are coupled together and to a variable current source 824. The source of the bias NMOS transistor 806 is coupled to the anode 802 and the drain terminal of the rectifying NMOS transistor 810, and the drain of the bias PMOS transistor 808 is coupled to the cathode 804 and the source terminal of the rectifying PMOS transistor 812.

In the rectifier stage 800, the drain terminal of the rectifying NMOS transistor 810, the source terminal of the rectifying PMOS transistor 812, and the terminals of the bias NMOS and PMOS transistors 806 and 808 are at a direct current (DC) or non-time-varying potential. In contrast, the gate and source terminals of the rectifying NMOS transistor 810 and the gate and drain terminals of the rectifying PMOS transistor 812 are coupled to RF or time-varying potentials via the RF+ input 816 and the RF− input 814. The RF blocks 818 serve to isolate the nodes at DC potential from the RF nodes in the rectifier stage 800 and to prevent pumping of the bias transistors 806/808. In other embodiments, other methods may be used to isolate DC nodes from RF nodes. One such method is described in commonly-assigned U.S. Pat. No. 9,000,835 issued on Apr. 7, 2015, hereby incorporated by reference in its entirety.

The bias transistors 806 and 808, in conjunction with bias currents supplied by the variable current sources 822 and 824, apply variable bias potentials to the gates of the rectifying transistors 810 and 812, which allow the operating points of the rectifying transistors 810 and 812, and therefore the operating point of the rectifier stage 800, to be adjusted. For example, the operating points of the rectifying transistors 810 and 812 may be adjusted to improve rectifying performance. Operating point adjustment may also be used to mitigate a power-based impedance change as described above. In embodiments where the input impedance of an associated circuit front-end is to be increased or maintained, a control circuit (e.g., the operating-point adjustment circuits 654 and 754) may change the operating point of the rectifier stage 800 by reducing the biasing currents provided by the variable current sources 822 and 824, thereby reducing the rectifying efficiency of and increasing the impedance value associated with the rectifier stage 800. For example, the control circuit may be configured to reduce the biasing currents based on the same criteria with which appropriate operating points are determined, as described above in FIG. 6.

Figure 9:
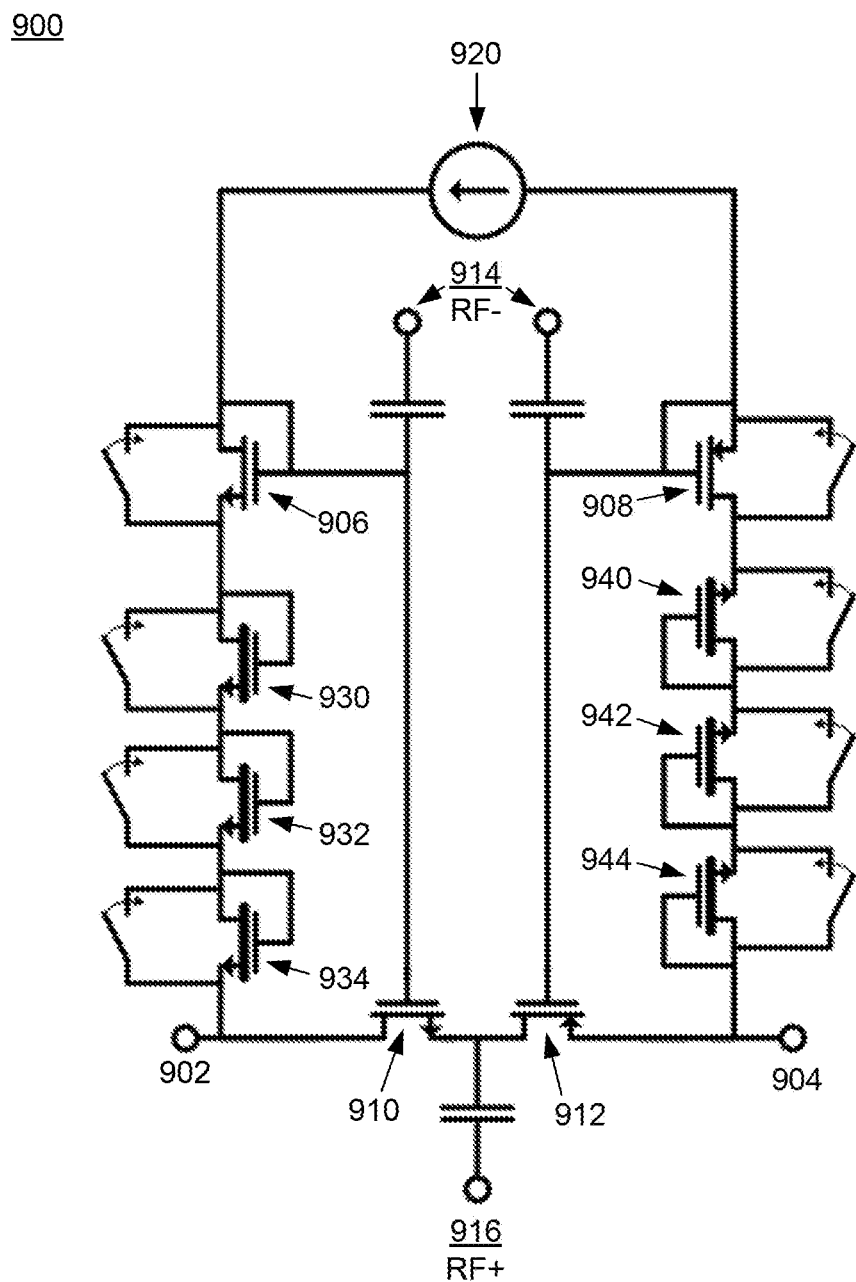
FIG. 9 depicts another example rectifier stage configured to mitigate power-based impedance changes according to embodiments.

FIG. 9 depicts another example rectifier stage 900 configured to mitigate power-based impedance changes according to embodiments. Similar to the rectifier stage 800 in FIG. 8, the rectifier stage 900 is implemented with n-channel metal-oxide semiconductor (NMOS) transistors and p-channel metal-oxide semiconductor (PMOS) transistors as rectifying and biasing elements. A main current path of the rectifier stage 900 extends from anode 902 to cathode 904, through a drain and source of a rectifying NMOS transistor 910 and a drain and source of a rectifying PMOS transistor 912. The source of the rectifying NMOS transistor 910 and the drain of the rectifying PMOS transistor 912 are coupled to an RF+ input 916, which in turn may receive an RF signal having a particular phase from an IC contact (e.g., one of the IC contacts 432/433) or terminal (e.g., one of the terminals 602/604). The gates of the rectifying NMOS transistor 910 and the rectifying PMOS transistor 912 are coupled to an RF− input 914, which may receive an RF signal of a different phase than RF+ input 916 from another IC contact or terminal.

The gate of the rectifying NMOS transistor 910 is further coupled to the gate of a bias NMOS transistor 906, and the gate of the rectifying PMOS transistor 912 is coupled to the gate of a bias PMOS transistor 908. The gate and drain of the bias NMOS transistor 906 are coupled together and to the output of a current source 920, and the gate and source of the bias PMOS transistor 908 are coupled together and to the input of the current source 920. The source of the bias NMOS transistor 906 is coupled to the anode 902 and the drain terminal of the rectifying NMOS transistor 910 via diode-connected NMOS transistors 930, 932, and 934, connected serially. Similarly, the drain of the bias PMOS transistor 908 is coupled to the cathode 904 and the source terminal of the rectifying PMOS transistor 912 via diode-connected NMOS transistors 940, 942, and 944, connected serially. Each of the diode-connected NMOS transistors 930-934/940-944 is configured with a switch that allows the corresponding transistor to be bypassed (for example, when the switch is switched into an electrical short-circuit configuration). The diode-connected transistors 930-934/940-944 allow biasing potentials to be applied to the gates of the rectifying transistors 910 and 912, and the biasing potentials may be adjusted by selectively bypassing particular diode-connected transistors via their associated switches, for example to adjust the operating points of the rectifying transistors 910 and 912. The bias transistors 906 and 908 are also each configured with a bypass switch, allowing rectifying transistors 910 and 912 to be substantially or entirely de-biased (i.e., to have no applied biasing) by bypassing the bias transistors 906 and 908.

While three diode-connected transistors are coupled to each rectifying transistor in the rectifier stage 900, in other embodiments a rectifier stage may have more or fewer diode-connected transistors and still implement the same functionality. In some embodiments, the number of diode-connected transistors coupled to a particular rectifying transistor may differ from the number of diode-connected transistors coupled to another rectifying transistor in the same rectifier stage.

As with the rectifier stage 800, the biasing potentials applied to the gates of the rectifying transistors 910 and 912 by the bias transistors 906/908 and the diode-connected transistors 930-934/940-944 may be used to mitigate power-based impedance changes. In embodiments, where the input impedance of an associated circuit front-end is to be increased or maintained, a control circuit (e.g., the operating-point adjustment circuits 654 and 754) may reduce the biasing potentials applied to the gates of the rectifying transistors 910 and 912 by bypassing one or more of the bias transistors 906/908 and the diode-connected transistors 930-934/940-944. Reduction of the biasing potential changes the operating point of the rectifying transistors 910 and 912, and may reduce the rectifying efficiency of and increase the impedance value associated with the rectifier stage 900. For example, the control circuit may be configured to reduce the biasing potential and bypass transistors based on the same criteria with which appropriate operating points are determined, as described above in FIG. 6.

Figure 10:
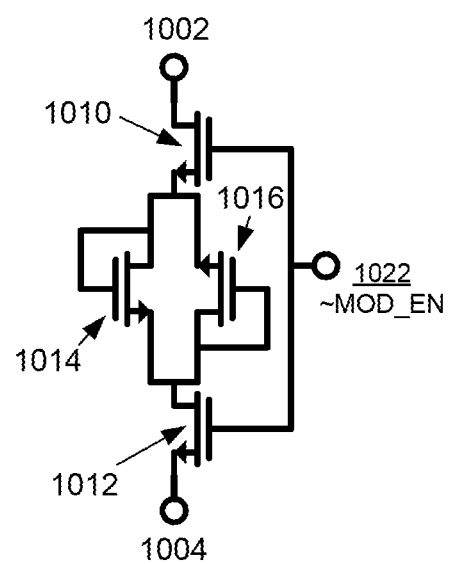
FIG. 10 depicts an example RF clamping circuit configured to mitigate power-based impedance changes according to embodiments.

FIG. 10 depicts an example RF clamping circuit 1000 configured to mitigate power-based impedance changes according to embodiments. RF clamping circuit 1000, similar to RF clamp 620, includes a first diode-connected NMOS transistor 1014 coupled in parallel to a second diode-connected NMOS transistor 1016, where the source terminal of each transistor is coupled to the drain terminal of the other transistor. The parallel combination of the diode-connected NMOS transistors 1014 and 1016 are further coupled to NMOS transistors 1010 and 1012, configured as switches that turn on and off based on an input ~MOD_EN 1022, similar to input ~MOD_EN 622. The NMOS transistors 1010 and 1012 are further coupled to terminals 1002 and 1004, which may correspond to terminals of a front-end, such as terminals 602 and 604, respectively, of the front-end 600.

In some embodiments, when a front-end including RF clamping circuit 1000 is beginning a backscattering operation, the input ~MOD_EN 1022 may receive a signal configured to cause the NMOS transistors 1010 and 1012 to switch off, thereby decoupling or disconnecting the NMOS transistors 1014 and 1016 from the terminals 1002 and 1004. When the front-end is no longer involved in a backscattering operation, the input ~MOD_EN 1022 may receive another signal configured to cause the NMOS transistors 1010 and 1012 to switch on, thereby coupling or connecting the NMOS transistors 1014 and 1016 to the terminals 1002 and 1004.

In some embodiments, an RF clamping circuit may be configured to vary the electrical resistance between two terminals continuously or in three or more discrete steps, as described above. In these embodiments, a control input (for example, from a control circuit such as the operating-point adjustment circuits 654/754) may cause the RF clamping circuit to adjust its impedance or resistance to mitigate power-based impedance changes.

While the circuit configurations above are described using NMOS, PMOS, and diode-connected transistors, in other embodiments other devices may be used. For example, diodes such as PN junctions or Schottky diodes may be used instead of or in addition to diode-connected transistors. In some embodiments, other components, such as MESFETs, BJTs, floating-gate devices, or any other suitable switching elements may be used instead of or in addition to MOSFETs.

Figure 11:
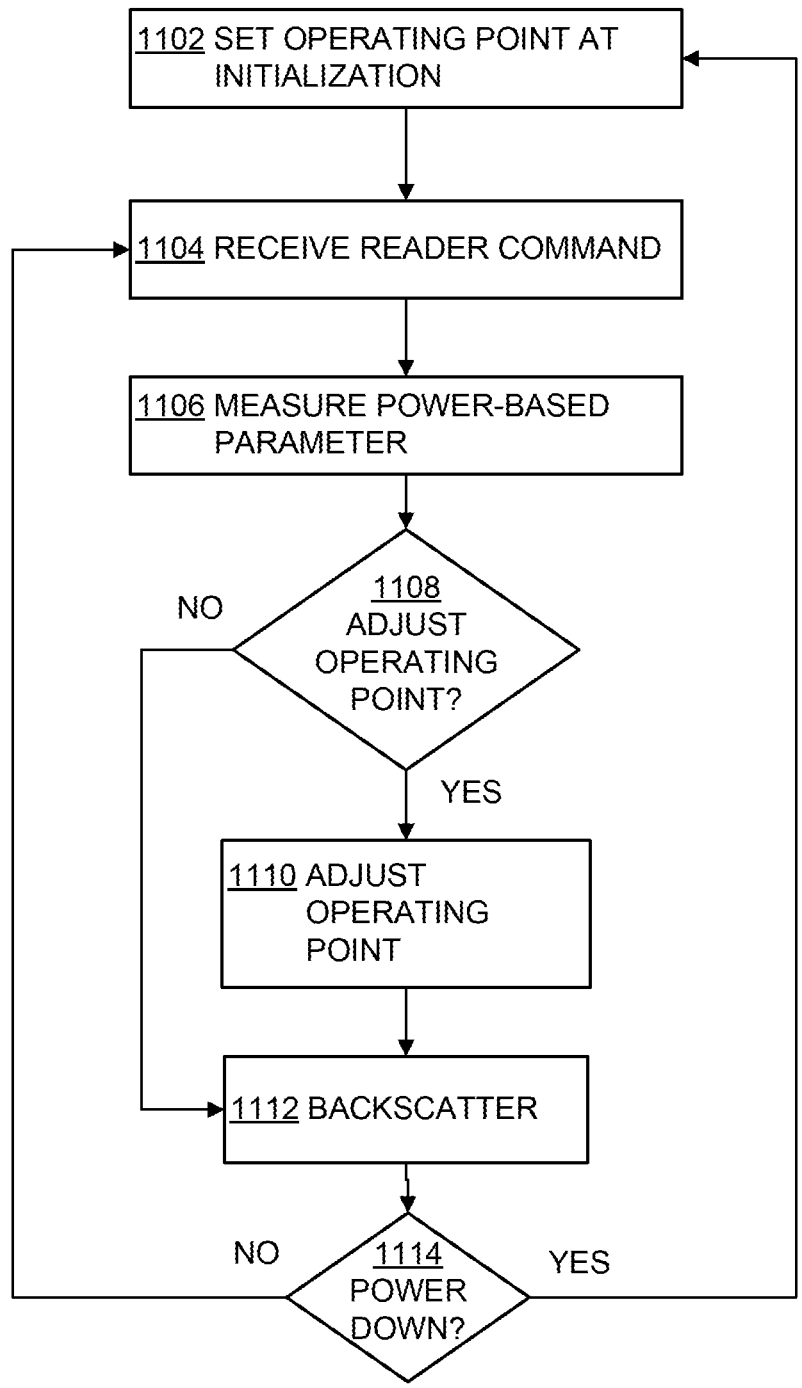
FIG. 11 is a flowchart illustrating an example process to mitigate power-based impedance changes according to embodiments.

FIG. 11 is a flowchart illustrating an example process 1100 to mitigate power-based impedance changes according to embodiments. Process 1100 may begin at step 1102, in which an initialization of an RFID IC or a circuit of the RFID IC occurs and the operating point of an input circuit of the IC is set. The initialization may be an event or point in time, and may include or correspond to an IC power-up, an input circuit (e.g., a rectifier, a modulator, a demodulator, a power detector, a tuning circuit, an RF clamp circuit, an ESD circuit, another component associated with the RFID IC front end, etc.) power-up, and/or an IC controller power-up. In some embodiments, the initialization may also include or correspond to receiving a reader command, determining that an RF input voltage, current, or power satisfies a particular criterion, or any other suitable event. A controller in the IC may set the operating point of the input circuit as described herein. For example, the controller may measure a parameter developed from an incident RF wave as described above, and may use the parameter measurement and/or a difference between the parameter measurement and a previous measurement or threshold to determine an appropriate operating point for the input circuit. The controller may use the measurement or difference to retrieve the appropriate operating point setting from an IC memory, as input into an algorithm that outputs the appropriate operating point setting, and/or as input into a circuit block or feedback circuit that outputs the appropriate operating point setting. In some embodiments, the controller may receive an appropriate operating point setting from an external reader. The controller may then set the operating point of the input circuit accordingly.

At step 1104, the RFID IC receives a reader command. The reader command may instruct the RFID IC to respond by backscattering an RF wave modulated with data symbols. At step 1106, a controller such as the RFID IC or a controller circuit implemented in the RFID IC may measure a parameter developed from the incident RF wave and/or extracted RF power, as described above. At step 1108, the controller may determine whether to adjust the operating point of the input circuit, for example to mitigate intrinsic impedance changes due to changes in incident RF power. The controller may perform the determination at step 1108 based on the measurement of step 1106 and/or a difference between the measurement of step 1106 and a previous measurement or threshold. For example, the controller may determine whether the measurement of step 1106 and/or a difference based on the measurement of step 1106 meets or exceeds a particular threshold.

If at step 1108 the controller determines that the input circuit operating point should be adjusted (for example, if the controller determines that the threshold was exceeded), then at step 1110 the controller may adjust the operating point of the input circuit to mitigate intrinsic impedance changes as described above. For example, the controller may decrease a bias current and/or a bias potential of the input circuit as described above, reducing the input circuit efficiency but increasing the input circuit intrinsic impedance, to counteract a decrease in intrinsic impedance due to increased incident RF power.

After the controller adjusts the input circuit operating point at step 1110, or if the controller determines at step 1108 that the input circuit operating point should not be adjusted, at step 1112 the RFID IC may perform the backscattering process. In some embodiments, the controller may revert or undo any operating point adjustment made in step 1110 upon completion of backscatter, or if the backscatter process is interrupted (for example, if the RFID IC loses power before completion of the backscatter process). Subsequently, the RFID IC may determine at step 1114 whether it should power down, for example based on a command received from the reader or in response to loss of power. If at step 1114 the RFID IC determines that it should or will power down, then the RFID IC may power down and return to step 1102. On the other hand, if at step 1114 the RFID IC determines that it should not power down, then it may return to step 1104, where another reader command may be received.

In some embodiments, the controller may not perform steps 1106 and 1108, and may instead always adjust the input circuit operating point during or prior to backscatter. This may simplify the backscatter process, because the controller does not have to perform the measurement and determination. In other embodiments, the controller or a separate circuit may be configured to constantly or periodically adjust the input circuit operating point. For example, the controller or the separate circuit may continuously monitor the power-based parameter and adjust the input circuit operating point accordingly, without waiting for a reader command. In some embodiments, the controller or the separate circuit may be configured to adjust the input circuit operating point prior to backscatter, then maintain or hold the input circuit operating point during backscatter to avoid disrupting the backscatter or modulation process.

Figure 12:
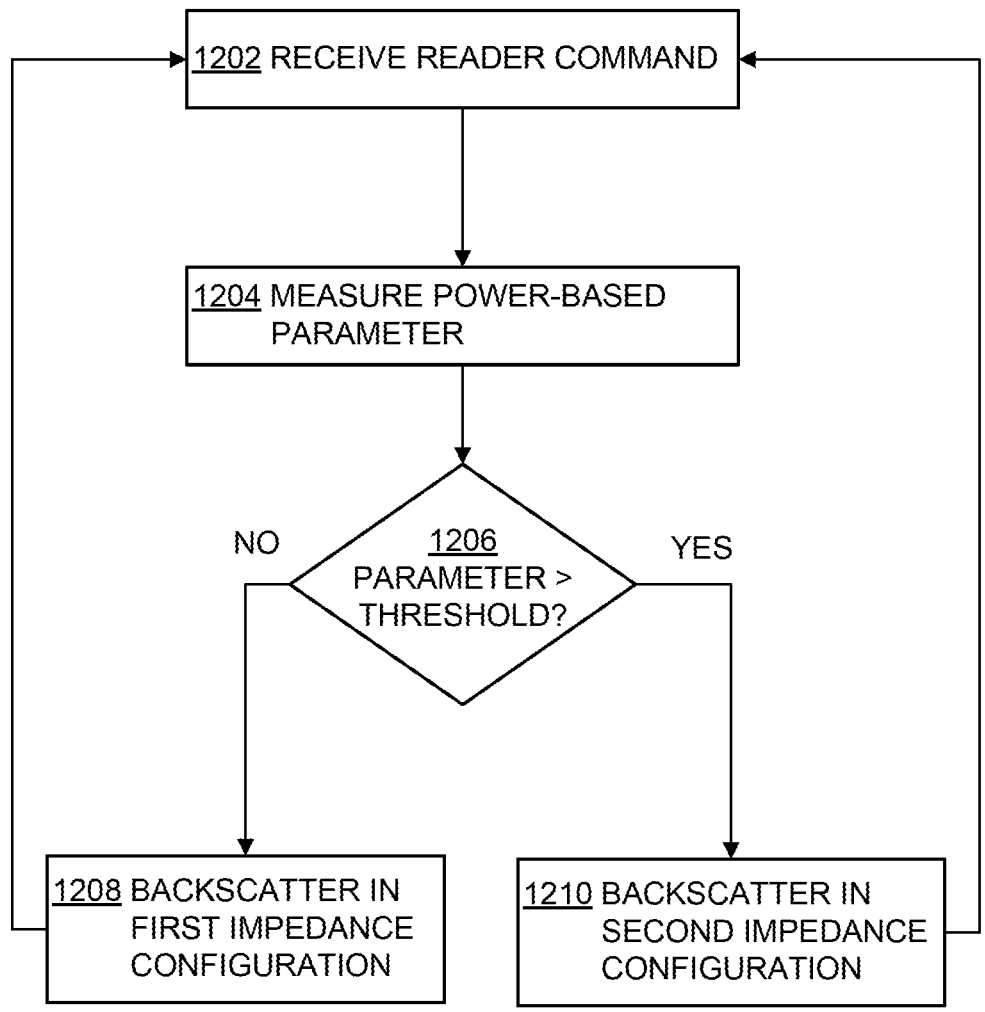
FIG. 12 is a flowchart illustrating another example process to mitigate power-based impedance changes according to embodiments.

FIG. 12 is a flowchart illustrating another example process 1200 to mitigate power-based intrinsic impedance changes according to embodiments, which may be used in conjunction with or instead of the process 1100. Process 1200 may begin at step 1202, in which an RFID IC receives a reader command. The reader command may instruct the RFID IC to respond by backscattering an RF wave modulated with data symbols. At step 1204, a controller such as the RFID IC or a controller circuit implemented in the RFID IC may measure a parameter developed from the incident RF wave and/or extracted RF power, similar to step 1106. At step 1206, the controller may determine whether the parameter measurement exceeds a threshold. If at step 1206 the controller determines that the parameter measurement does not exceed the threshold, at step 1208 the controller may cause the RFID IC to backscatter in a first impedance configuration where the RFID IC modulates data symbols onto a backscattered RF wave using a modulator such as the modulator 630, as described above. On the other hand, if at step 1206 the controller determines that the parameter measurement exceeds the threshold, at step 1210 the controller may cause the RFID IC to backscatter in a second impedance configuration where the RFID IC modulates data symbols onto a backscattered RF wave using a rectifier such as the rectifier 650, as described above. After backscattering at steps 1208 or 1210, the RFID IC may return to step 1202, where another reader command may be received.

The operations described in processes 1100 and 1200 are for illustrative purposes only. These operations may be implemented using additional or fewer operations and in different orders using the principles described herein.

While in the above description mitigation of power-based impedance changes are described in the context of mitigating a power-based impedance decrease, the techniques described herein may also be used to mitigate power-based impedance increases. For example, the operating point of a rectifier or component may be adjusted such that the intrinsic impedance of the rectifier or component decreases to counteract an increase in impedance caused by a decrease in incident power. In some embodiments, the RFID IC may be configured to adjust the operating point of a rectifier or component in response to a decrease in incident power that may inadvertently cause portions of the RFID IC to lose power. For example, the RFID IC may be configured to set the rectifier or component operating point to a default value upon a reset event following loss of power. As another example, the RFID IC may be configured to determine and set a new operating point for the rectifier or component upon a reset event following loss of power. In some embodiments, the RFID IC may be configured to automatically or continuously adjust the rectifier or component operating point such that power loss does not occur in response to a decrease in incident power.

In some examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to develop a parameter from an RF input voltage present at the IC input; detect a change in the parameter corresponding to a change in the RF input voltage, wherein the change in the RF input voltage may also reduce the intrinsic impedance; and increase the intrinsic impedance by adjusting an operating point of the rectifier based on the detected parameter change, to at least partially compensate for the reduction.

In other examples, the controller may be further configured to adjust the operating point of the rectifier during at least a portion of a backscatter interval. The IC may further include a clamp circuit coupled to the IC input and contributing to the intrinsic impedance, and wherein the controller may be further configured to decouple the clamp circuit from the IC input to at least partially compensate for the reduction. The controller may be configured to develop the parameter from at least one of a delivered rectifier voltage; a delivered rectifier current; and a delivered rectifier power.

In further examples, the IC may also include a feedback circuit coupled to an output of the rectifier, wherein the controller may be configured to develop the parameter from the feedback circuit. The controller may be configured to adjust the operating point of the rectifier based on at least one of a transfer function, a lookup table, a threshold comparison, a stability criterion, an output of a feedback circuit, and a received reader command. The controller may also be configured to adjust the operating point of the rectifier by at least one of adjusting a bias voltage to at least one rectifier operating stage; adjusting a bias current to at least one rectifier operating stage; and adjusting a number of rectifier operating stages, wherein the rectifier operating stages may convert an alternating current signal to a direct current signal. The controller may be configured to adjust the operating point of the rectifier to change a rectifier efficiency.

According to other examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to develop a parameter from an RF input voltage present at the IC input; determine a first value from the parameter at a first time; set an operating point of the rectifier based on the first value; determine a second value from the parameter at a second time after the first time; detect, based on the first and second values, a change in the parameter corresponding to a change in the RF input voltage, wherein the change in the RF input voltage may also reduce the intrinsic impedance; and increase the intrinsic impedance by adjusting the operating point of the rectifier based on at least the second value, to at least partially compensate for the reduction.

According to some examples, the first time may be at a circuit initialization. The controller may be further configured to adjust the operating point of the rectifier during at least a portion of a backscatter interval. The IC may also include a clamp circuit coupled to the IC input and contributing to the intrinsic impedance, wherein the controller may be further configured to decouple the clamp circuit from the IC input to at least partially compensate for the reduction. The controller may be configured to develop the parameter from at least one of a delivered rectifier voltage, a delivered rectifier current, and a delivered rectifier power. The IC may further include a feedback circuit coupled to an output of the rectifier, wherein the controller may be configured to develop the parameter from the feedback circuit. The controller may be configured to adjust the operating point of the rectifier based on at least one of a transfer function, a lookup table, a threshold comparison, a stability criterion, an output of a feedback circuit, and a received reader command.

According to further examples, a Radio Frequency Identification (RFID) integrated circuit (IC) configured to mitigate impedance changes associated with RF voltage changes is described. The IC may include an IC input having an intrinsic impedance; a rectifier coupled to the IC input, wherein the rectifier contributes to the intrinsic impedance; and a controller coupled to the rectifier. The controller may be configured to determine whether the intrinsic impedance has been reduced due to a change in an RF input voltage present at the IC input; determine whether the IC is about to enter a backscatter interval; and if the intrinsic impedance has been reduced and the IC is about to enter a backscatter interval, then increase the intrinsic impedance during the backscatter interval by adjusting an operating point of the rectifier, to at least partially compensate for the reduction.

According to yet other examples, the IC may further include a clamp circuit coupled to the IC input and contributing to the intrinsic impedance, wherein the controller may be further configured to decouple the clamp circuit from the IC input to at least partially compensate for the reduction. The controller may be configured to develop the parameter from at least one of a delivered rectifier voltage, a delivered rectifier current, and a delivered rectifier power. The IC may also include a feedback circuit coupled to an output of the rectifier, wherein the controller may be configured to develop the parameter from the feedback circuit. The controller may also be configured to adjust the operating point of the rectifier based on at least one of a transfer function, a lookup table, a threshold comparison, a stability criterion, an output of a feedback circuit, and a received reader command.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In this disclosure, time points or intervals may be enumerated and indicated as "first time", "second time", "third time", and the like. A time point may refer to a particular time instant, with a duration on the order of or less than a microsecond, and different time points do not overlap. A time interval may have a duration on the order of or greater than about a nanosecond, and may overlap, be entirely subsumed within, or entirely include a different time interval. While different time indicators are enumerated using ordinal indicators (that is, "first", "second"), the ordinal indicators do not necessarily indicate the chronological order of the referenced time point or interval. For example, a first time point or interval may fall before or after a second time point or interval.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) integrated circuit (IC) configured to switch between different backscattering impedance configurations, the IC comprising:
    an IC input having an intrinsic impedance;
    a modulator coupled to the IC input;
    a rectifier coupled to the IC input and contributing to the intrinsic impedance; and
    a controller coupled to the modulator and the rectifier and configured to:
        develop a parameter from an RF input voltage present at the IC input;
        detect a change in the parameter corresponding to a change in the RF input voltage, wherein the change in the RF input voltage also reduces the intrinsic impedance;
        determine that the change exceeds a threshold; and
        in response to the determination, cause the IC to switch from backscattering replies using the modulator to backscattering replies using the rectifier.

2. The IC of claim 1, wherein the controller is configured to, if the change does not exceed the threshold, increase the intrinsic impedance by adjusting an operating point of the rectifier based on the detected parameter change, to at least partially compensate for the reduction.

3. The IC of claim 1, wherein the controller is configured to develop the parameter from at least one of:
    a delivered rectifier voltage;
    a delivered rectifier current; and
    a delivered rectifier power.

4. The IC of claim 1, further comprising a feedback circuit coupled to an output of the rectifier, wherein the controller is configured to develop the parameter from the feedback circuit.

5. The IC of claim 1, wherein the controller is further configured to switch the rectifier between different operating points to cause the IC to backscatter replies.

6. The IC of claim 5, wherein the controller is further configured to determine the different operating points based on at least one of:
    a transfer function,
    a lookup table,
    a threshold comparison,
    a stability criterion,
    an output of a feedback circuit, and
    a received reader command.

7. The IC of claim 5, wherein the controller is configured to switch the rectifier between different operating points by at least one of:
    adjusting a bias voltage to at least one rectifier operating stage;
    adjusting a bias current to at least one rectifier operating stage; and
    adjusting a number of rectifier operating stages, wherein the rectifier operating stages convert an alternating current signal to a direct current signal.

8. A Radio Frequency Identification (RFID) integrated circuit (IC) configured to switch between different backscattering impedance configurations, the IC comprising:
    an IC input;
    a modulator coupled to the IC input;
    a rectifier coupled to the IC input; and
    a controller coupled to the modulator and the rectifier and configured to:
        develop a parameter from an RF input voltage present at the IC input;
        determine whether the parameter exceeds a threshold;
        receive a reader command; and
        if the parameter exceeds the threshold, then backscatter a reply to the reader command by switching the rectifier between different operating points, else backscatter the reply by switching the modulator between different impedance states.

9. The IC of claim 8, wherein the parameter is based on a detected power.

10. The IC of claim 8, wherein the controller is configured to develop the parameter from at least one of:
    a delivered rectifier voltage;
    a delivered rectifier current; and
    a delivered rectifier power.

11. The IC of claim 8, further comprising a feedback circuit coupled to an output of the rectifier, wherein the controller is configured to develop the parameter from the feedback circuit.

12. The IC of claim 8, wherein the controller is further configured to determine the different operating points based on at least one of:
- a transfer function,
- a lookup table,
- a threshold comparison,
- a stability criterion,
- an output of a feedback circuit, and
- a received reader command.

13. The IC of claim 8, wherein the controller is configured to switch the rectifier between different operating points by at least one of:
- adjusting a bias voltage to at least one rectifier operating stage;
- adjusting a bias current to at least one rectifier operating stage; and
- adjusting a number of rectifier operating stages, wherein the rectifier operating stages convert an alternating current signal to a direct current signal.

14. A Radio Frequency Identification (RFID) integrated circuit (IC) configured to backscatter by adjusting rectifier operating points, the IC comprising:
- an IC input;
- a modulator coupled to the IC input and configured to be in one of a low-impedance state and a high-impedance state;
- a rectifier coupled to the IC input and configured to be at one of at least a first operating point and a reduced-bias operating point; and
- a controller coupled to the modulator and the rectifier and configured to:
  - receive a reader command;
  - develop a parameter from an RF input voltage present at the IC input;
  - determine that the parameter exceeds a threshold; and
  - in response to the determination, cause the IC to backscatter a reply to the reader command by switching between a first impedance state and a second impedance state, wherein:
    - in the first impedance state, the modulator is in the low-impedance state; and
    - in the second impedance state, the modulator is in the high-impedance state and the rectifier is at the reduced-bias operating point.

15. The IC of claim 14, wherein the parameter is a change in power causing a reduction in an intrinsic impedance of the IC input.

16. The IC of claim 14, wherein the controller is configured to develop the parameter from at least one of:
- a delivered rectifier voltage;
- a delivered rectifier current; and
- a delivered rectifier power.

17. The IC of claim 14, further comprising a feedback circuit coupled to an output of the rectifier, wherein the controller is configured to develop the parameter from the feedback circuit.

18. The IC of claim 14, wherein:
- the first operating point is a normally-biased operating point; and
- the rectifier is at the first operating point in the first impedance state.

19. The IC of claim 14, wherein the controller is further configured to determine the first and reduced-bias operating points based on at least one of:
- a transfer function,
- a lookup table,
- a threshold comparison,
- a stability criterion,
- an output of a feedback circuit, and
- a received reader command.

20. The IC of claim 14, wherein the controller is further configured to switch the rectifier between different operating points by at least one of:
- adjusting a bias voltage to at least one rectifier operating stage;
- adjusting a bias current to at least one rectifier operating stage; and
- adjusting a number of rectifier operating stages, wherein the rectifier operating stages convert an alternating current signal to a direct current signal.

* * * * *

UNITED STATES PATENT AND TRADEMARK OFFICE
CERTIFICATE OF CORRECTION

PATENT NO. : 10,885,417 B1
APPLICATION NO. : 16/797801
DATED : January 5, 2021
INVENTOR(S) : Theron Stanford et al.

Page 1 of 1

It is certified that error appears in the above-identified patent and that said Letters Patent is hereby corrected as shown below:

On the Title Page

In Column 2 (Attorney Agent, or Firm), Line 1, Delete "Turk" and insert -- Turk, --, therefor.

In the Specification

In Column 19, Line 3, Delete "may" and insert -- may be --, therefor.
In Column 19, Line 48, Delete "0720," and insert -- 720, --, therefor.
In Column 28, Line 15, Delete "and or" and insert -- and/or --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*